(12) United States Patent
Bougeard

(10) Patent No.: US 10,217,593 B2
(45) Date of Patent: Feb. 26, 2019

(54) FUSE BOX FOR MOTOR VEHICLE

(71) Applicant: RENAULT s.a.s., Boulogne-Billancourt (FR)

(72) Inventor: Stephan Bougeard, Trappes (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 15/534,615

(22) PCT Filed: Dec. 11, 2015

(86) PCT No.: PCT/FR2015/053443
§ 371 (c)(1),
(2) Date: Jun. 9, 2017

(87) PCT Pub. No.: WO2016/102801
PCT Pub. Date: Jun. 30, 2016

(65) Prior Publication Data
US 2017/0365435 A1 Dec. 21, 2017

(30) Foreign Application Priority Data

Dec. 22, 2014 (FR) ...................................... 14 63050

(51) Int. Cl.
*H01H 85/20* (2006.01)
*H01H 85/54* (2006.01)
*H02B 1/18* (2006.01)

(52) U.S. Cl.
CPC .......... *H01H 85/205* (2013.01); *H01H 85/20* (2013.01); *H01H 85/54* (2013.01);
(Continued)

(58) Field of Classification Search
CPC ...... H01H 85/12; H01H 85/205; H01H 85/54; H01H 2085/208; H01H 2085/2075;
(Continued)

(56) References Cited

U.S. PATENT DOCUMENTS 5,594,403 A    1/1997 Taga et al.
5,645,448 A *  7/1997 Hill ...................... H01H 85/205
                                              439/522

(Continued)

FOREIGN PATENT DOCUMENTS

FR    2 953 980 A1    6/2011
FR    2 988 901 A1    10/2013

(Continued)

OTHER PUBLICATIONS

International Search Report dated Mar. 3, 2016 in PCT/FR2015/053443 filed Dec. 11, 2015.

(Continued)

*Primary Examiner* — Anatoly Vortman
*Assistant Examiner* — Jacob R Crum
(74) *Attorney, Agent, or Firm* — Oblon, McClelland, Maier & Neustadt, L.L.P.

(57) ABSTRACT

An automotive vehicle fuse box includes a receptacle having a bottom, a pair of fuses fitted into the bottom, a pair of output terminals coupled to first ends, respectively, of the fuses, and a pair of input terminals coupled to second ends, respectively, of the fuses. The pair of output terminals extends from the receptacle in a first direction, while the pair of input terminals extends from the receptacle in a second direction. The fuse box also includes at least one other pair of fuses fitted into the bottom and another pair of input terminals coupled to second ends, respectively, of the other pair of fuses. The other pair of input terminals extends substantially in parallel to the second direction. First ends of the other pair of fuses are coupled to the terminals of the pair of output terminals, respectively.

13 Claims, 2 Drawing Sheets

(52) U.S. Cl.
CPC ......... *H02B 1/18* (2013.01); *H01H 2085/208* (2013.01); *H01H 2085/2095* (2013.01)

(58) Field of Classification Search
CPC ............. H01H 2085/209; H01H 85/20; H01H 2085/2095; H02B 1/18
USPC .......................................................... 337/187
See application file for complete search history.

(56) References Cited

U.S. PATENT DOCUMENTS

| | | | | |
|---|---|---|---|---|
| 5,795,193 | A * | 8/1998 | Yang | H01R 9/2458 439/620.27 |
| 6,309,253 | B1 * | 10/2001 | Tsai | H01H 85/2045 439/620.27 |
| 6,545,861 | B1 | 4/2003 | Hayes et al. | |
| 6,753,754 | B1 | 6/2004 | Black et al. | |
| 2003/0022536 | A1 * | 1/2003 | Saito | H01H 85/044 439/76.2 |
| 2006/0024992 | A1 | 2/2006 | Kanazawa | |
| 2007/0046417 | A1 * | 3/2007 | Pavlovic | H01H 85/153 337/187 |
| 2009/0251200 | A1 * | 10/2009 | Urrea | H01H 85/12 327/525 |
| 2013/0241687 | A1 * | 9/2013 | Ishizaki | H01H 9/085 337/187 |
| 2015/0015062 | A1 * | 1/2015 | Stern | B60R 16/0238 307/9.1 |
| 2015/0069835 | A1 | 3/2015 | Colchen et al. | |

FOREIGN PATENT DOCUMENTS

| | | |
|---|---|---|
| GB | 238 963 A | 8/1925 |
| JP | 2003-125517 A | 4/2003 |

OTHER PUBLICATIONS

French Search Report dated Oct. 21, 2015 in FR 1463050 filed Dec. 22, 2014.

* cited by examiner

FUSE BOX FOR MOTOR VEHICLE

BACKGROUND

The present invention relates to a fuse box for an automotive vehicle allowing various electric current lines to be protected by fuses.

One field of application that has been envisaged in particular, but not exclusively, is that of electric automotive vehicles and, in particular, the electrical networks of the battery providing high-voltage connections thereto.

The volume of automotive vehicles, other than that dedicated to the passenger compartment, is getting increasingly smaller. In addition, vehicles are incorporating new functions or new means that are supplied with electric current. This evolution is of course even more apparent in the case of electrically driven automotive vehicles.

This compactness, in particular of the powertrain of these vehicles, necessarily leads to a rationalization of space and hence to a decrease in free space.

All of the elements of the powertrain are involved, including the fuse box. Additionally and by its nature, the latter must be easily accessible, in particular for the purpose of changing defective fuses.

Moreover, the development of automotive vehicle models takes place at a fast pace and they include new items of electrical equipment that must also be protected by fuses. The addition of new fuses then requires the dimensions of fuse boxes to be increased, which is hardly compatible with the compactness of the available space. Additionally, the space reserved for the fuse box is specially shaped and it tends to be standardized across vehicle models.

As such, one problem that has arisen and which the present invention aims to address is to provide a fuse box that allows, in particular, new fuses to be accommodated without having to modify the shaping of the space reserved for the fuse box in prior vehicle models.

BRIEF SUMMARY

To this end, the present invention proposes a fuse box for an automotive vehicle including a receptacle having a bottom and an opening leading to said bottom, and a pair of fuses fitted into said bottom and intended to protect an electrical device, each of the fuses of said pair having a first end and a second end, said fuse box comprising a pair of output terminals coupled to the first ends, respectively, of said fuses and a pair of input terminals coupled to the second ends, respectively, of said fuses, said pair of output terminals extending from said receptacle in a first direction, while said pair of input terminals extends from said receptacle in a second direction. The fuse box additionally comprises at least one other pair of fuses fitted into said bottom and intended to protect another electrical device that is connected in parallel with said first device, each of the fuses of said at least one other pair having another first end and another second end, and another pair of input terminals coupled to the other second ends, respectively, said other pair of input terminals extending substantially in parallel to said second direction; and the other first ends of said at least one other pair of fuses are coupled to the terminals of said pair of output terminals, respectively.

Thus, one feature of the invention resides in the implementation of another pair of fuses inside the housing when the protection of another electrical device of the automotive vehicle is desired, and the mutualization of the output terminals of the housing that are intended to be connected to the battery of accumulators. Such a mutualization allows, despite the addition of an additional pair of fuses, the size of the housing to be kept the same so that it remains able to fit into the space reserved for this purpose.

Preferably, said pair of output terminals extends laterally from said receptacle. Thus, the other pair of fuses extends substantially along a median plane defined by said pair of fuses, while the pair of output terminals is common to both pairs of fuses. In addition, advantageously, said first direction in which said pair of output terminals extends is substantially parallel to said bottom of the receptacle.

Moreover, said second direction in which the pairs of input terminals extend is substantially perpendicular to said bottom. As such, the pairs of input terminals are grouped into one and the same spatial zone located below the receptacle, opposite the opening. Specifically, said pair of input terminals and said other pair of input terminals extend in an opposite direction to said opening. As such, the cables leading to these pairs of input terminals may consist of a bundle, while the pair of output terminals remains separate and is connected directly to the battery of accumulators.

Preferably, said other first ends of said at least one other pair of fuses are coupled to the interior of said receptacle at the terminals of said pair of output terminals, respectively. As such, this coupling takes place in the space already reserved for the receptacle, without encroaching on a zone located outside this space. As such it is a simple matter, regardless of the automotive vehicle, to replace the existing fuse box with a new one including another pair of fuses without further modification.

According to one particularly advantageous embodiment of the invention, the resistance of said at least one other pair of fuses is lower than that of said pair of fuses. Thus, when the new electrical device requires a higher current, fuses of higher amperage, or lower resistance, are then installed inside the receptacle. Despite their differences in amperage, the first ends of the pairs of fuses are coupled to the respective terminals of the pair of output terminals.

According to one preferred mode of implementation of the invention, the fuse box comprises a first output conductor connecting one of said first ends and one of said other first ends with one of said output terminals, and a second output conductor connecting the other of said first ends and the other of said other first ends with the other of said output terminals, and said first and second conductors extend along one and the same proximal median plane. Thus, the first and second output conductors allow the two output terminals to be connected together in one and the same plane to the first ends of the fuses, respectively. As will be explained below, the first and second conductors are embedded in the thickness of the bottom of the receptacle, as close to the fuses as possible, and they form only one with the respective output terminals. The receptacle is molded in a polymer material, and another function thereof is to electrically insulate the conductors.

According to another preferred mode of implementation of the invention, the fuse box comprises a pair of input conductors for coupling said pair of input terminals to said second ends, respectively, of said fuses, said pair of input conductors having two superposed first portions defining two parallel distal planes, respectively. The two first portions of the pair of input conductors are positioned so as to be distanced from the first and second conductors. They extend substantially in parallel to these first and second conductors. As will be explained in greater detail further on in the description, these two first portions are extended by two substantially perpendicular respective second portions, the output terminals being formed at the ends thereof.

According to yet another mode of implementation, the fuse box comprises another pair of input conductors for coupling said other pair of input terminals to said other second ends, respectively, of said fuses of said other pair, said other pair of input conductors having two other first portions, respectively, extending along one and the same intermediate plane. The two other first portions are contiguous and they extend between the first and second conductors and the two first portions of said pair of input conductors. They are extended by two other substantially perpendicular respective second portions, the other output terminals being formed at the ends thereof.

BRIEF DESCRIPTION OF THE DRAWINGS

Other distinctive features and advantages of the invention will become apparent on reading the description below of one particular embodiment of the invention, which is provided by way of non-limiting indication and with reference to the appended drawings, in which.

DETAILED DESCRIPTION

Figure 1:
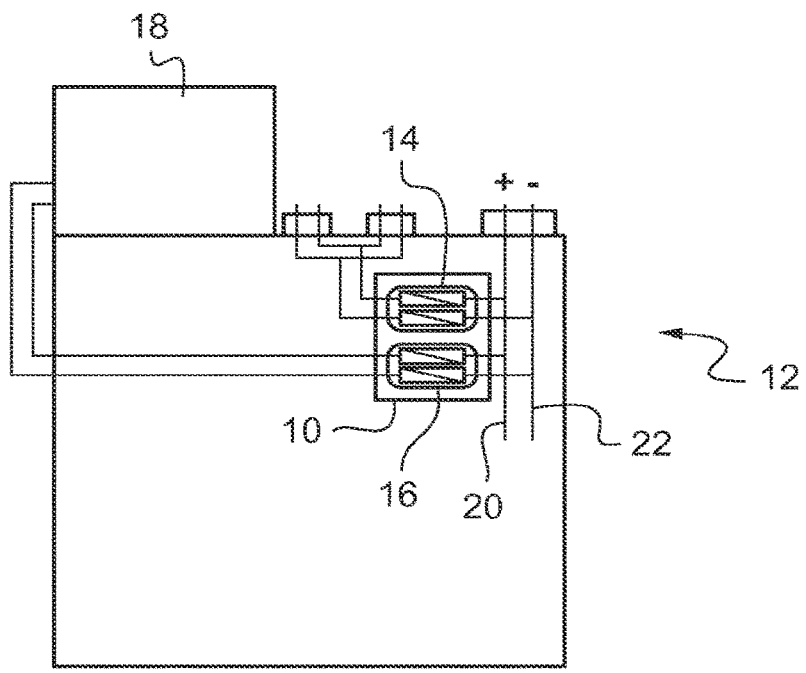
FIG. 1 is a partial diagram showing a fuse box in accordance with the invention in a network assembly.

FIG. 1 schematically illustrates a fuse box 10 for an automotive vehicle, located in an environment including a high-voltage battery network 12. The term "fuse" is used here to mean "fused circuit breaker". The fuse box 10 includes a first pair of fuses 14 intended to protect electrical equipment, here for example the heating device and the air conditioning in parallel. It will be noted that the fuses of the pair of fuses 14 are installed on the positive electrical line and the negative electrical line, respectively, of the equipment.

The fuse box 10 includes a second pair of fuses 16 intended to protect a charger 18. The charger is connected in parallel with the aforementioned electrical equipment and, consequently, with the second pair of fuses 16. In this instance, the amperage values of the two pairs of fuses 14, 16 are different. For example, the value of the first pair of fuses 14 is 40 A, while the value of the second pair of fuses 16 is 50 A. The two pairs of fuses 14, 16 are connected to the positive 20 and negative 22 cables, respectively, which are themselves connected to the battery of accumulators.

Figure 2:
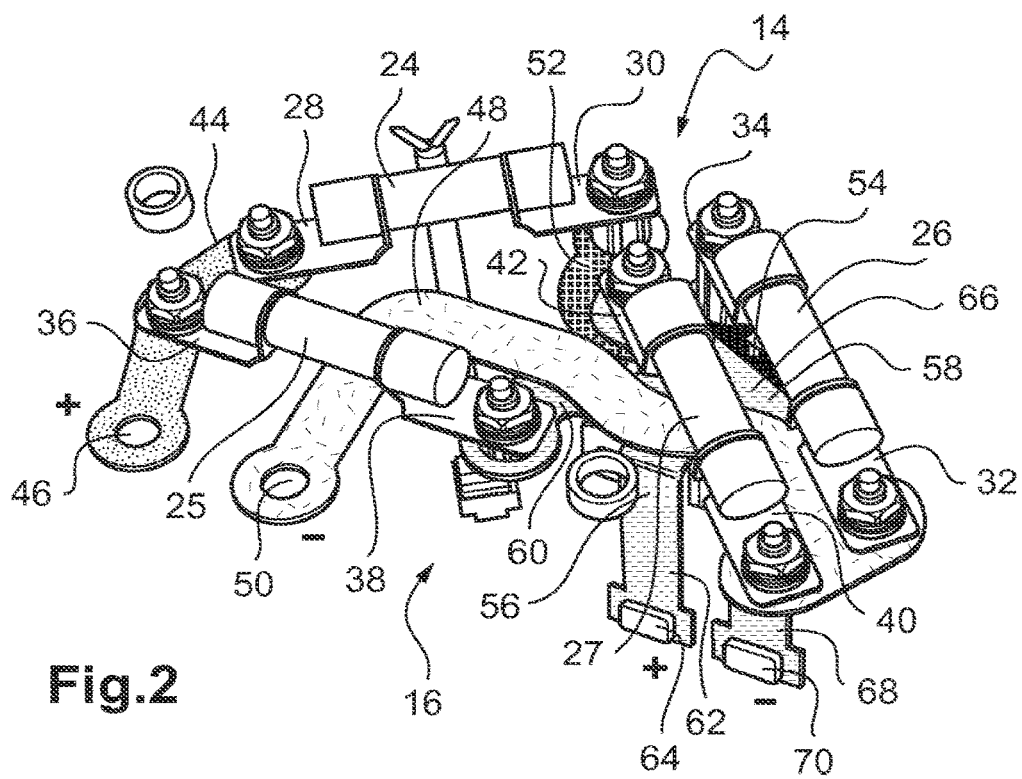
FIG. 2 is a partial schematic view in perspective of the fuse box in accordance with the invention from a first viewing angle.

Reference is made to FIG. 2 in which the two pairs of fuses 14, 16 are arranged, the first pair 14 comprising a first positive fuse 24 of the positive current line and a first negative fuse 26 of the negative current line, and the second pair 16 comprising a second positive fuse 25 of the positive current line and a second negative fuse 27 of the negative current line.

Regarding the first pair 14, the first positive fuse 24 has a first positive low-voltage terminal 28 and a second positive low-voltage terminal 30, while the first negative fuse 26 has a first negative low-voltage terminal 32 and a second negative low-voltage terminal 34.

Regarding the second pair 16, the second positive fuse 25 has a first positive high-voltage terminal 36 and a second positive high-voltage terminal 38, while the second negative fuse 27 has a first negative high-voltage terminal 40 and a second negative high-voltage terminal 42. The concepts of "low voltage" and of "high voltage" relate here to the various power supply networks of the automotive vehicle.

The current limit value of the first positive 24 and negative 26 fuses, which are intended to protect the heating device and the air conditioning, is 40 A for example, while the current limit value of the second positive 25 and negative 27 fuses is 50 A for example.

According to the invention, the first positive low-voltage terminal 28 and the first positive high-voltage terminal 36 are electrically connected together by means of a first output conductor 44. The ends of the fuses are secured to the first output conductor 44 by means of screw fastening. The first output conductor 44, formed from a first plate, is extended by a first free end terminating in a first eyelet 46 forming a positive output terminal. Similarly, the first negative low-voltage terminal 32 and the first negative high-voltage terminal 40 are electrically connected together by means of a second output conductor 48. The latter is formed from a second plate, extending longitudinally in an L-shape and terminating in a second free end terminating in a second eyelet 50 forming a negative output terminal. The second free end extends into the vicinity of the first free end. Thus, the fuses of different current limit values are arranged according to polarity and their ends are coupled to one another by means of the first output conductor 44 and of the second output conductor 48, respectively, in order to be connected to the positive 20 and negative 22 cables, respectively, of the battery of accumulators. As such, the first and second output conductors 44, 48 act as busbars. In this instance, they have three separate connection points. Such an arrangement contributes to the fuse box 10 having a small footprint. Additionally, by their nature, the impedance of the first and second output conductors 44, 48 is low.

It will be noted that the first 44 and second 48 output conductors are by their nature flat and they extend along one and the same proximal plane PP located below and in the vicinity of the pairs of fuses 14, 16. Likewise, the pairs of fuses 14, 16 extend along a median plane PF, to which the proximal plane is substantially parallel.

Additionally, the fuse box 10 includes a first pair of input conductors, a first positive input conductor 52 and a first negative input conductor 54, which will be described in greater detail with reference to FIG. 5. They are connected to the second positive low-voltage terminal 30 of the first positive fuse 24 and to the second negative low-voltage terminal 34 of the first negative fuse 26, respectively.

The fuse box 10 comprises a second pair of input conductors, a second positive input conductor 56 and a second negative input conductor 58. They are connected to the second positive high-voltage terminal 38 of the second positive fuse 25 and to the second negative high-voltage terminal 42 of the second negative fuse 27, respectively.

The second positive input conductor 56 has a first second positive portion 60 and a second second positive portion 62 that is folded so as to be substantially perpendicular to the first. The second second positive portion 62 is extended axially by a second positive input terminal 64. As such, the first second positive portion 60 extends substantially in parallel to the proximal plane PP, while the second second positive portion 62 extends substantially perpendicularly thereto.

The second negative input conductor 58 has a first second negative portion 66 and a second second negative portion 68 that is also folded so as to be substantially perpendicular to the first and parallel to and contiguous with the second second positive portion 62. The second second negative portion 68 is extended axially by a second negative input terminal 70.

The first second negative portion 66 extends substantially in parallel to the proximal plane PP, and the second second negative portion 68 extends substantially perpendicularly to the proximal plane PP.

The second pair of input conductors 56, 58 is located below the first negative fuse 26 and the second negative fuse 27, which are arranged so as to be substantially parallel to one another. Reference is made to FIG. 5 which shows the second pair of input conductors 56, 58 in greater detail; the second positive input conductor 56, the first second positive portion 60 of which and the second, perpendicular second positive portion 62 of which terminating in the second positive input terminal 64, and the second negative input conductor 58, the first second negative portion 66 of which and the second second negative portion 68 of which terminating in the second negative input terminal 70. It will be noted in this FIG. 5 that the first second positive 60 and negative 66 portions of the pair of input conductors 56, 58 extend along one and the same intermediate plane PI that is substantially parallel to the proximal plane PP. These first second positive 60 and negative 66 portions extend below and at a distance from the second output conductor 48. To achieve this, they are connected to the second positive high-voltage terminal 38 of the second positive fuse 25 and to the second negative high-voltage terminal 42 of the second negative fuse 27, respectively, via two first intermediate pads 72, 74 forming struts.

Figure 5:
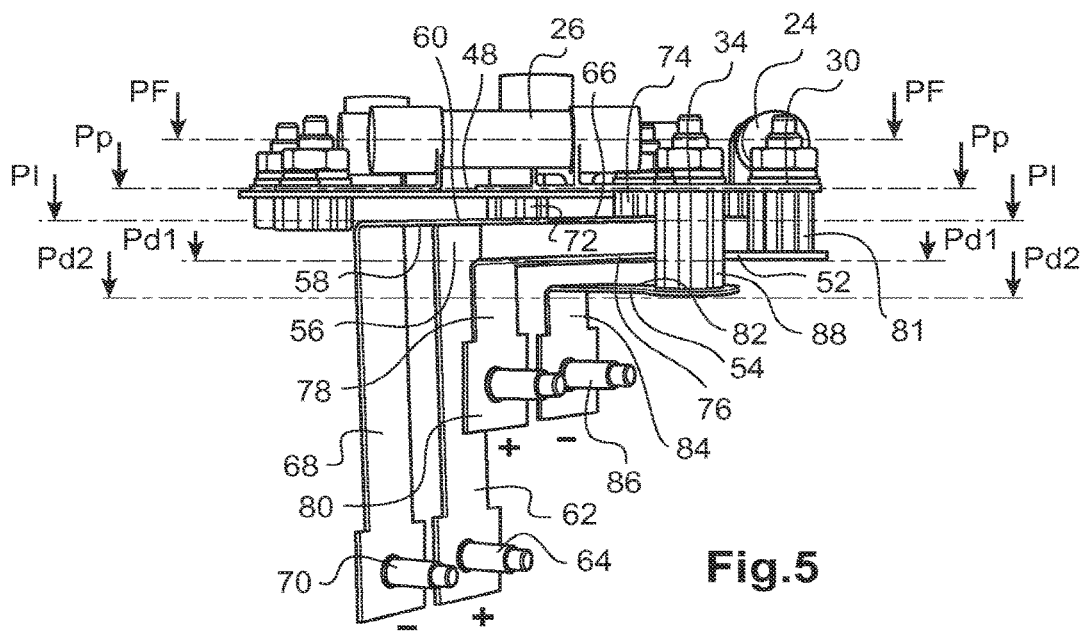
FIG. 5 is a partial schematic view in perspective of the fuse box in accordance with the invention from a third viewing angle.

This FIG. 5 shows the first positive input conductor 52 and the first negative input conductor 54 connected to the second positive low-voltage terminal 30 of the first positive fuse 24 and to the second negative low-voltage terminal 34 of the first negative fuse 26, respectively.

The first positive input conductor 52 has a first first positive portion 76 and a second first positive portion 78 that is folded so as to be substantially perpendicular to the first. The second first positive portion 78 is extended axially by a first positive input terminal 80. As such, the first first positive portion 76 also extends substantially in parallel to the proximal plane PP, while the second second positive portion 78 extends substantially perpendicularly thereto. However, the first first positive portion 76 extends along a first distal plane Pd1 and axially at a distance from the first second positive portion 60 and from the first second negative portion 66. To achieve this, the first positive portion 76 is connected to the second positive low-voltage terminal 30 of the first positive fuse 24 via a first distal pad 81 forming a strut and the length of which is substantially greater than that of the two first intermediate pads 72, 74.

The first negative input conductor 54 has a first first negative portion 82 and a second first negative portion 84 that is also folded so as to be substantially perpendicular to the first and parallel to and contiguous with the second first positive portion 78. The second first negative portion 84 is extended axially by a first negative input terminal 86.

However, the first first negative portion 82 is connected to the second negative low-voltage terminal 34 of the first negative fuse 26 via a second distal pad 88 the length of which is greater than that of the first distal pad 81. As such, the first first negative portion 82 crosses the first first positive portion 76 of the first positive input conductor 52 therebelow. The first first negative portion 82 then extends along a second distal plane Pd2.

It will be noted that the second second positive portion 62 and the second second negative portion 68 are of the same length, which length is greater than that of the second first positive portion 78 and the second first negative portion 84. As such, the second positive input terminal 64 and the second negative input terminal 70, which are located at the same level, extend below the level of the first positive input terminal 80 and of the first negative input terminal 86.

In this way, there is a superposition over four levels, below the pairs of fuses 14, 16, of the first and second output conductors 44, 48, up to the first first negative portion 82, the electrical couplings between the fuses 24, 25, 26, 27, and the positive and negative output terminals 46, 50 on the one hand, and the first positive 80 and negative 86 input terminals and the second positive 64 and negative 70 input terminals on the other hand. Forming these electrical couplings below the level of the fuses contributes to the compactness of the fuse box 10.

Figure 3:
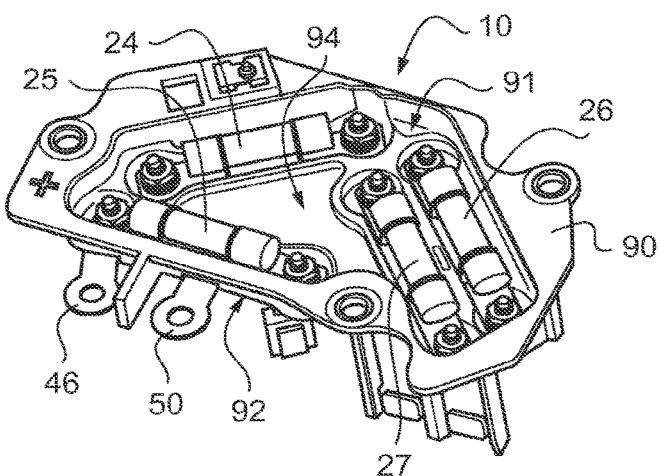
FIG. 3 is a schematic view in perspective of the fuse box in accordance with the invention from said first viewing angle.

Specifically, FIG. 3 shows the fuse box 10, which comprises a receptacle 90 having an opening 91 leading to a bottom 92 and a bottom wall 94 on which the first positive 24 and negative 26 fuses and the second positive 25 and negative 27 fuses are arranged. As such, the first and second output conductors 44, 48, the first pair of input conductors 52, 54 and the second pair of input conductors 56, 58 are embedded together in the bottom 92 of the receptacle 90. The receptacle 90 is in fact overmolded onto the conductors. The positive and negative output terminals 46, 50 then extend laterally from the receptacle 90. The fuses 24, 25, 26, 27 are subsequently installed and connected on the bottom wall 94 of the receptacle 90.

The plastic overmolding material is of course an electrically insulating material.

Figure 4:
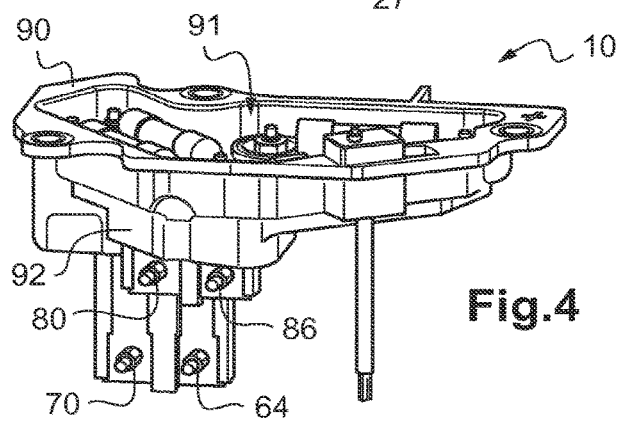
FIG. 4 is a schematic view in perspective of the fuse box in accordance with the invention from a second viewing angle.

FIG. 3 thus shows the positive 46 and negative 50 output terminals, while FIG. 4, which illustrates the fuse box 10 from behind with respect to the representation of FIG. 3, shows the first positive 80 and negative 86 input terminals on the one hand and the second positive 64 and negative 70 input terminals on the other hand.

The invention claimed is:

1. A fuse box for an automotive vehicle, comprising:
   a receptacle having a bottom and an opening leading to said bottom; and
   a pair of fuses fitted into said bottom and intended to protect an electrical device, each of the fuses of said pair having a first end and a second end;
   a pair of output terminals coupled to the first ends, respectively, of said fuses and a pair of input terminals coupled to the second ends, respectively, of said fuses, said pair of output terminals extending from said receptacle in a first direction, while said pair of input terminals extends from said receptacle in a second direction;
   at least one other pair of fuses fitted into said bottom and intended to protect another electrical device that is connected in parallel with said first device, each of the fuses of said at least one other pair having another first end and another second end, and another pair of input terminals coupled to the other second ends, respectively, said other pair of input terminals extending substantially in parallel to said second direction, and the other first ends of said at least one other pair of fuses are coupled to said pair of output terminals, respectively; and a pair of input conductors to couple said pair of input terminals to said second ends, respectively, of said fuses, said pair of input conductors having two superposed first portions defining two parallel distal planes, respectively, wherein the pair of input terminals is positioned below the pair of fuses and the at least one other pair of fuses, and the other pair of input terminals is positioned below the pair of input terminals.

2. The fuse box as claimed in claim 1, wherein said pair of output terminals extends laterally from said receptacle.

3. The fuse box as claimed in claim 1, wherein said first direction is substantially parallel to said bottom.

4. The fuse box as claimed in claim 1, wherein said second direction is substantially perpendicular to said bottom.

5. The fuse box as claimed in claim 1, wherein said pair of input terminals and said other pair of input terminals extend in an opposite direction to said opening.

6. The fuse box as claimed in claim 1, wherein said other first ends of said at least one other pair of fuses are coupled to the interior of said receptacle at said pair of output terminals, respectively.

7. The fuse box as claimed in claim 1, wherein a resistance of said at least one other pair of fuses is lower than a resistance of said pair of fuses.

8. The fuse box as claimed in claim 1, further comprising:
a first output conductor connecting one of said first ends and one of said other first ends with one of said output terminals; and
a second output conductor connecting the other of said first ends and the other of said other first ends with the other of said output terminals,
wherein said first and second conductors extend along a same proximal median plane.

9. The fuse box as claimed in claim 1, further comprising:
another pair of input conductors to couple said other pair of input terminals to said other second ends, respectively, of said fuses of said other pair, said other pair of input conductors having two other first portions, respectively, extending along a same intermediate plane.

10. The fuse box as claimed in claim 1, wherein the two superposed first portions of the pair of input conductors are not coplanar.

11. The fuse box as claimed in claim 1, wherein:
the second end of a first fuse of the pair of fuses is connected to a first first portion of the two superposed first portions via a first distal pad,
the second end of a second fuse of the pair of fuses is connected to a second first portion of the two superposed first portions via a second distal pad, and
a length of the second distal pad is greater than a length of the first distal pad.

12. The fuse box as claimed in claim 9, wherein:
each fuse of the pair of fuses and the at least one other pair of fuses extends along a median plane, and
the intermediate plane along which the two other first portions extend is parallel to and positioned below the median plane along which each fuse of the pair of fuses and the at least one other pair of fuses extends.

13. A fuse box for an automotive vehicle, comprising:
a receptacle having a bottom and an opening leading to said bottom; and
a pair of fuses fitted into said bottom and intended to protect an electrical device, each of the fuses of said pair having a first end and a second end;
a pair of output terminals coupled to the first ends, respectively, of said fuses and a pair of input terminals coupled to the second ends, respectively, of said fuses, said pair of output terminals extending from said receptacle in a first direction, while said pair of input terminals extends from said receptacle in a second direction;
at least one other pair of fuses fitted into said bottom and intended to protect another electrical device that is connected in parallel with said first device, each of the fuses of said at least one other pair having another first end and another second end, and another pair of input terminals coupled to the other second ends, respectively, said other pair of input terminals extending substantially in parallel to said second direction, and the other first ends of said at least one other pair of fuses are coupled to said pair of output terminals, respectively; and
another pair of input conductors to couple said other pair of input terminals to said other second ends, respectively, of said fuses of said other pair, said other pair of input conductors having two other first portions, respectively, extending along a same intermediate plane,
wherein the pair of input terminals is positioned below the pair of fuses and the at least one other pair of fuses, and the other pair of input terminals is positioned below the pair of input terminals,
wherein each fuse of the pair of fuses and the at least one other pair of fuses extends along a median plane, and
wherein the intermediate plane along which the two other first portions extend is parallel to and positioned below the median plane along which each fuse of the pair of fuses and the at least one other pair of fuses extends.

* * * * *